Figure 1:
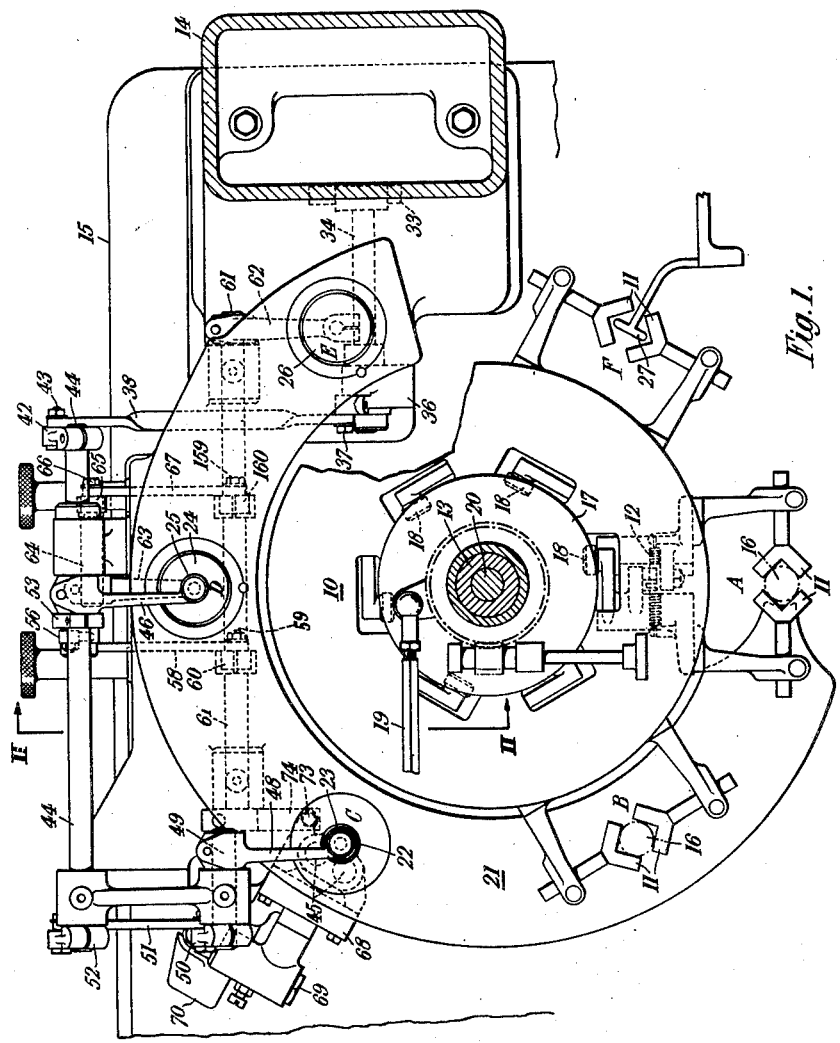

May 26, 1953 L. BROOK 2,639,568
WRAPPING MACHINE
Filed April 29, 1952 3 Sheets-Sheet 1

INVENTOR
Leonard Brook
By Watson, Cole, Grindle & Watson
ATTORNEYS

May 26, 1953 L. BROOK 2,639,568
WRAPPING MACHINE
Filed April 29, 1952 3 Sheets-Sheet 3

INVENTOR
Leonard Brook
By Watson, Cole, Grindle & Watson
ATTORNEYS

Patented May 26, 1953

2,639,568

UNITED STATES PATENT OFFICE 2,639,568

WRAPPING MACHINE

Leonard Brook, Beeston, Leeds, England, assignor to The Forgrove Machinery Company Limited, Leeds, Yorkshire, England, a company of Great Britain Application April 29, 1952, Serial No. 284,995
In Great Britain April 25, 1951

5 Claims. (Cl. 53—45)

Wrapping machines are normally driven by electric motors, and in machines which produce a heat seal in the wrapper it is customary to employ a heater which is periodically brought into contact with wrapped articles traversed past it in succession by a rotary carrier head or other intermittently moving conveyor.

It is desirable that, if the machine should be stopped for any reason, the heater should be prevented from remaining in contact with a wrapped article, particularly in the case of a sweet wrapping machine, or in close proximity to the grippers on the carrier head should there be no article in position in the grippers, since the grippers usually have rubber pads for gripping the article between them. It has been the practice to achieve this by employing a manually operated lever to stop and start the machine, this lever being mechanically coupled to the heater movement so that, when the machine is stopped, the heater will be withdrawn from its contact level by some $\frac{3}{16}''$.

It is, however, much more convenient to control starting and stopping of the machine by push button switches, and the object of this invention is to provide an electrically controlled trip gear for automatically holding the heater away from contact with the article on interruption of the current supply to the electric motor driving the machine.

According to the invention, the heater is periodically operated, in timed relation with the movement of the carrier head, from a driven member driven, through the agency of a spring, from a driving member in the direction to move the heater towards the article held in the carrier head grippers and adapted to be positively returned by the driving member and the mechanism includes a catch for coacting with the driven member to prevent movement of the heater into contact with the article and an electromagnetic device, connected in circuit with the motor driving the machine, for controlling the position of the catch, the arrangement being such that the catch is held in inoperative position so long as current is supplied to the motor but is moved to operative position immediately the current supply to the motor is interrupted.

The operator therefore has merely to depress a stop button to stop the machine and when this is done the catch will automatically be rendered effective to prevent the heater from being moved too close to the article.

Figures 2, 3:
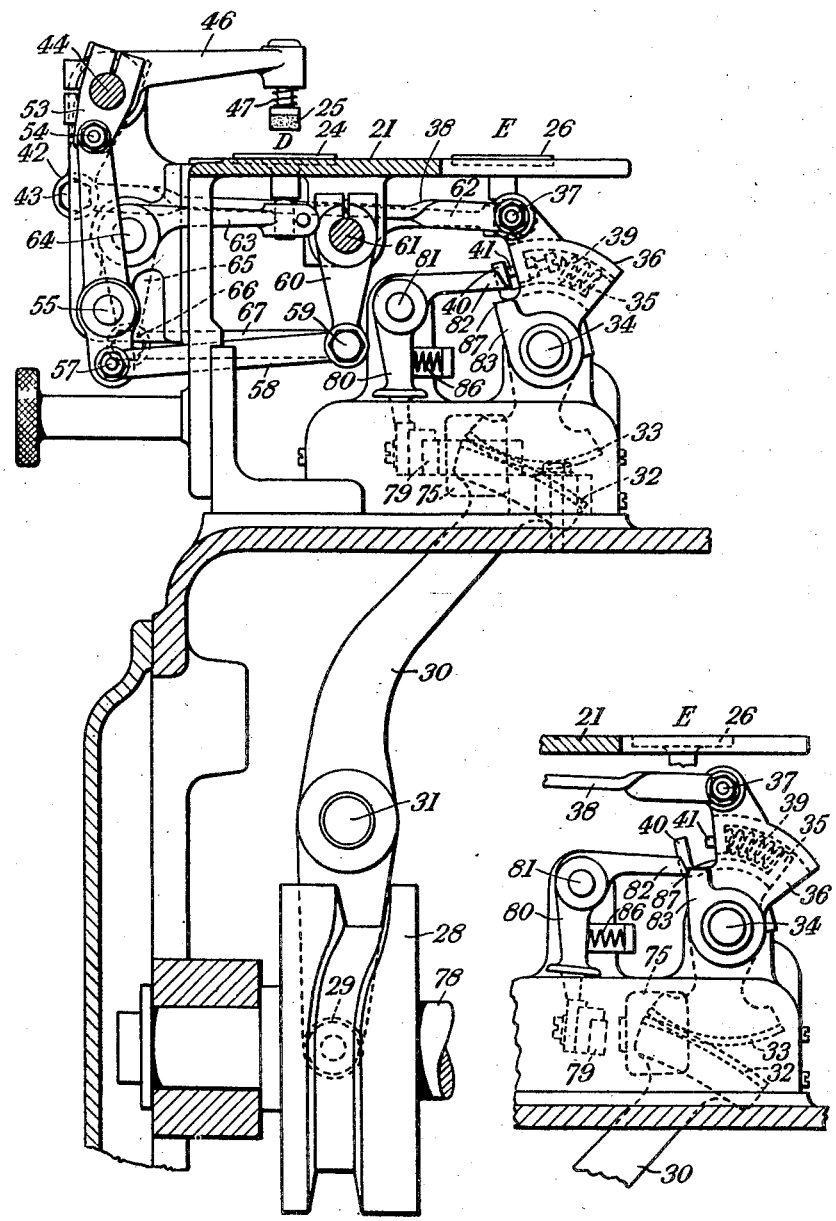
Figure 4:
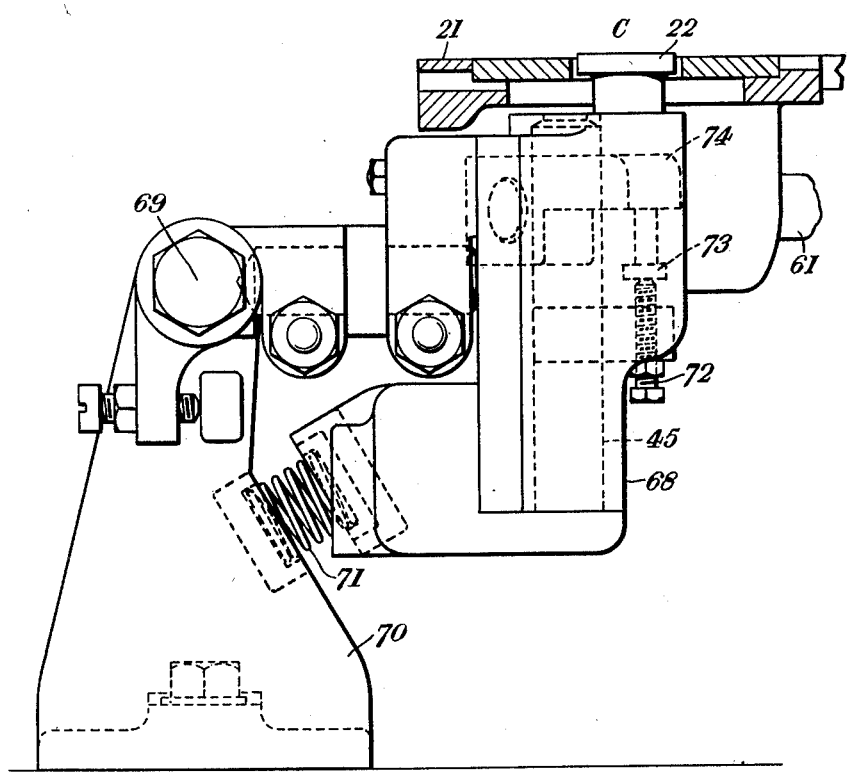
Figure 5:
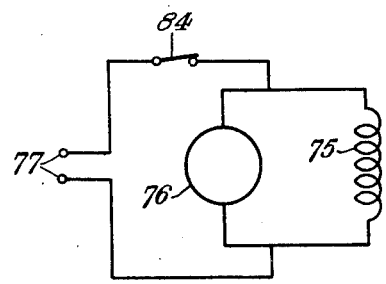

One embodiment of the invention, as applied to a bunch wrapping machine of the kind described in U. S. Application, Serial No. 283,332, will now be described in detail, by way of example, with reference to the accompanying drawings, in which:

Fig. 1 is a plan view of the carrier head and of the heating and cooling mechanism, Fig. 2 is a section on the line II—II in Fig. 1, but with the carrier head omitted, Fig. 3 is a view of part of the mechanism shown in Fig. 2 but with the trip mechanism engaged, Fig. 4 is a side view of the heater and associated mechanism, and Fig. 5 is a simplified circuit diagram.

Like reference characters designate like parts throughout the figures.

The machine is of the construction described in U. S. Application, Serial No. 283,332 and comprises a carrier head 10, carrying six pairs of grippers 11. The grippers 11 are pivotally mounted on the carrier head and are urged to closed position by springs 12. The carrier head 10 is suspended, by a tubular shaft 13, from a top gear box, not shown, but supported by a pillar 14 (Fig. 1) extending upwardly from the machine frame 15. A Geneva mechanism in the top gear box imparts intermittent rotation to the tubular shaft 13 to move the grippers 11 successively to stations A, B, C, D, E and F (Fig. 1).

At the loading station A a tablet 16 to be wrapped and a wrapper, of waxed paper or other heat sealing material, are lifted by a cooperating lifting plunger and top plunger through a brush and into the grippers 11 dwelling at station A, this mechanism being described in U. S. Application, Serial No. 283,332. The wrapper is thus draped partly around the tablet. A gripper opening cam 17 coacts with followers 18 associated with the grippers 11 and maintains the grippers at station A open while the tablet is being lifted to position between them. The cam 17 is then rocked in relation to the shaft 13, by a link 19 actuated by a cam, as described in U. S. Application, Serial No. 283,334, to cause the grippers to close on the tablet. A shaft 20, nested within the cam 17, is then rocked by another cam to cause a first folder to move across the base of the tablet held by a gripper at station A, to fold a part of the depending wrapper against the base of the tablet. The carrier head 10 then moves to carry the tablet to station B. During this movement the base of the tablet is moved over a fixed folder plate which folds the remaining depending portion of the wrapper against the base. Station B is an idle station, but further rotation of the carrier head 10 brings the tablet in succession to stations C, D and E and finally to a discharge station F. During its passage to stations C, D and E the base of the tablet is traversed along a stationary plate 21.

At station C, a heater 22 (see also Fig. 4) is lifted against the base of the tablet to heat seal the pleats formed in the wrapper folded against said base, and at the same time a top presser 23 (Fig. 1) is pressed against the top of the tablet. At station D, a cooling pad 24 is lifted against the base of the tablet and a top presser 25 is lowered into contact with its top surface. At station E, a cooling pad 26 is raised into contact with the base of the tablet. The gripper jaws dwelling at stations C, D and E are omitted from Fig. 1 for clarity. When the tablet reaches the discharge station F, the grippers 11 are opened by the cam 17 and a cam operated ejector 27 ejects the wrapped tablet into a discharge chute, not shown. If desired a top presser can be added at the second cooling station E.

Movement is imparted to the heating and cooling mechanisms at stations C, D and E by the mechanism now to be described. This mechanism is shown, in Figs. 1, 2 and 4, in the position which it occupies when the heating and cooling members have been moved to their operative positions.

A cam 28, Fig. 2, in the bottom gear box, coacts with a follower 29 on a lever 30, pivotally mounted at 31 and formed at its upper end with gear teeth 32. The gear teeth 32 mesh with a quadrant 33 fixed to a spindle 34. Fixed to the spindle 34 is an arm 35, and loose on the spindle 34 is an arm 36 pivoted, at 37, to a link 38. A compression spring 39, in a curved pocket between the arms 35, 36, serves to drive the arm 36 from the arm 35 when the latter is rocked anti-clockwise, to the position shown in Fig. 2. On the return, or clockwise, stroke of the arm 35, the arm 36 is returned positively by a lug 40 on the arm 35 which coacts with a screw 41 projecting from the arm 36. The link 38 serves, as later described, to actuate the heating and cooling mechanisms, and the spring 39 drives the link 38 in the direction to move the heater 22 towards the article at the heating station C and can yield in the event of obstruction to movement of the heater 22 or other parts operated by the link 38.

The link 38 is connected by a pin 43 to an arm 42 fixed to a shaft 44. To the shaft 44 is fixed an arm 46 carrying the top presser 25 at the first cooling station D, a spring 47 being disposed between the top presser 25 and the arm 46. Movement of the link 38 to the left as seen in Fig. 2, rocks the shaft 44 clockwise to lower the top presser 25 to the position shown.

The top presser 23 at the heating station C (Fig. 1) is carried by an arm 48 fixed to a spindle 49, carrying an arm 50 (see also Fig. 2) connected, by a link 51, to an arm 52 fixed to the shaft 44. When therefore the shaft 44 is rocked clockwise, as seen in Fig. 2, to lower the top presser 25 it also lowers the top presser 23.

The bottom cooler pads 24, 26 receive a considerably smaller movement than the top pressers 23, 25 and this movement is imparted to them through a linkage shown most clearly in Fig. 2. An arm 53 fixed to the shaft 44 is connected by a pin 54 to an arm 56 pivoted at 55 to the machine frame and joined, by a pin 57, to a link 58 coupled, by a pin 59, to an arm 60 fixed to a shaft 61. The cooler pad 26 at the second cooling station E is mounted on an arm 62 fixed to the shaft 61. Clockwise movement of the shaft 44, as seen in Fig. 2, is thus effective to rock the shaft 61 counter-clockwise and therefore to raise the cooler pad 26 to the position shown in Fig. 2.

The cooler pad 24 at the first cooling station D is carried by an arm 63, mounted to turn on a centre 64 and fixed to an arm 65 pivoted, by a pin 66, to a link 67 pivoted at its other end by a pin 159 (Fig. 1) to an arm 160 fixed to the shaft 61. The cooler pad 24 will therefore move up with the cooler pad 26.

As shown in Fig. 4, the heater 22 is supported by a bracket 68 containing twin electrically heated cartridges 45 and pivoted by a pin 69 to an upstanding bracket 70 on the machine frame. A spring 71 disposed between the brackets 68, 70 tends to lift the heater 22 to the position shown in Fig. 4. The bracket 68 carries a screw 72 which coacts with a tappet 73 projecting downwardly from an arm 74 fixed to the end of the shaft 61 (see Fig. 1). When the shaft 61 rocks anti-clockwise, to the position shown in Fig. 2, to raise the cooler pads 24, 26, the tappet 73 is lifted, allowing the spring 71 to lift the heater 22 to the operative position shown in Fig. 4. On clockwise movement of the shaft 61 to lower the cooler pads 24, 26 the tappet 73 depresses the screw 72, so moving the heater 22 away from the base of the tablet at the heating station C.

A solenoid 75 (see Figs. 2 and 5) is connected in parallel with an electric motor 76 across the motor supply terminals 77. The motor serves to drive the machine and, in particular, the shaft 78 (Fig. 2) carrying the cam 28. An armature 79 associated with the solenoid 75, is coupled to a bell crank lever 80, pivoted at 81. One arm of the bell crank is attached to the armature 79 and the other arm carries a steel catch piece 82 which is adapted to cooperate with a trip piece 83 fixed to the arm 36. When the machine is running, the solenoid 75 is energised and the catch piece 82 is held clear of the trip piece 83, as shown in Fig. 2, so that the heater operates normally. As soon as the current supply to the motor 76 is interrupted, by opening a switch 84 (Fig. 5), the solenoid 75 is de-energised and the bell crank 80 is rocked by a spring 86 to a position, shown in Fig. 3, in which the catch piece 82 engages a notch 87 in the trip piece 83 to prevent movement of the arm 36 to an extent sufficient to allow movement of the heater 22 into contact with the tablet. The machine will always overrun by at least one cycle after the stop button has been pressed and this will ensure that the catch piece 82 can move into operative position and so prevent the heater 22 from moving too close to the tablet.

If the stoppage of the machine is only momentary to clear a minor fault, the above described trip gear will ensure that no hindrance to the operation of the machine can be caused by melting of the tablet or damage by the heater 22 to the rubbers of the grippers 16 in case no tablet is in position between them. In the event of a longer stoppage the machine should be turned by hand to bring the grippers 16 into position beyond the heater.

The heater is supplied with current from a circuit independent of that of the motor so that the heater will not be deprived of current and so become cold during stoppage of the machine.

It will be understood that the trip mechanism according to the machine may be applied to heaters in wrapping machines other than those organised for bunch wrapping.

What I claim as my invention and desire to secure by Letters Patent is:

1. In a wrapping machine, comprising an electric motor for driving the machine, a movable heater, a conveyor, and means operated by said motor for intermittently moving said conveyor to traverse wrapped articles in succession past said heater, the combination with said heater of a driving member operated by said motor to perform forward and return strokes, a driven member linked to said heater, a spring operative on the forward stroke of the driving member to actuate the driven member to cause movement of the heater into contact with an article on the conveyor, means for positively returning said driven member on the return stroke of said driving member, a catch biased for movement to an operative position in which it prevents movement of said heater into contact with said article by said driven member, and an electromagnetic device connected in circuit with said motor for retaining said catch in inoperative position so long as said motor is running.

2. In a wrapping machine, comprising an electric motor for driving the machine, a movable heater, a conveyor, and means operated by said motor for intermittently moving said conveyor to traverse wrapped articles in succession past said heater, the combination with said heater of a driving member operated by said motor to perform forward and return strokes, a driven member linked to said heater, a spring operative on the forward stroke of the driving member to actuate the driven member to cause movement of the heater into contact with an article on the conveyor, means for positively returning said driven member on the return stroke of said driving member, a pivoted catch, a spring urging said catch into position to intercept said driven member and thereby prevent movement of said heater into contact with said article, a solenoid connected in circuit with said motor, and a cooperating armature connected to said catch, said solenoid serving to retain said catch in inoperative position so long as said motor is running.

3. In a bunch wrapping machine, comprising an electric motor for driving the machine, a movable heater, a carrier head, and means operated by said motor for intermittently rotating said carrier head to traverse wrapped articles in succession past said heater, the combination with said heater of a driving member operated by said motor to perform forward and return strokes, a driven member linked to said heater, a spring operative on the forward stroke of the driving member to actuate the driven member to cause movement of the heater into contact with an article on the carrier head, means for positively returning said driven member on the return stroke of said driving member, a catch biased for movement to an operative position in which it prevents movement of said heater into contact with said article, and an electromagnetic device connected in circuit with said motor for retaining said catch in inoperative position so long as said motor is running.

4. In a wrapping machine, comprising an electric motor for driving the machine, a movable heater, a conveyor, and means operated by said motor for intermittently moving said conveyor to traverse wrapped articles in succession past said heater, the combination with said heater of a driving member operated by said motor to perform forward and return strokes, a driven member, a first spring urging said heater towards said conveyor, a tappet linked to said driven member and normally coacting with said heater to retain it in inoperative position, a second spring operative on the forward stroke of the driving member to actuate the driven member to displace said tappet and thereby free said heater for movement by said first spring to operative position, means for positively returning said driven member, said tappet and said heater on the return stroke of said driving member, a catch biased for movement to an operative position in which it prevents movement of said tappet into position to free said heater, and an electromagnetic device connected in circuit with said motor for retaining said catch in inoperative position so long as said motor is running.

5. In a wrapping machine, comprising an electric motor for driving the machine, a movable heater, a conveyor, and means operated by said motor for intermittently moving said conveyor to traverse wrapped articles in succession past said heater, the combination with said heater of a pivoted driving arm, a cam operated by said motor for imparting forward and return strokes to said driving arm, a driven arm pivoted on the same axis as the driving arm and linked to said heater, a spring mounted in compression between said arms and operative on the forward stroke of the driving arm to actuate the driven arm to effect movement of the heater into contact with an article on the conveyor, an abutment on the driving arm for positively returning said driven arm on the return stroke of the driving arm, a catch biased for movement to an operative position in which it prevents movement of said heater into contact with said article, and an electromagnetic device connected in circuit with said motor for retaining said catch in inoperative position so long as said motor is running.

LEONARD BROOK.

References Cited in the file of this patent

UNITED STATES PATENTS

| Number | Name | Date |
|---|---|---|
| 1,217,694 | Bracy | Feb. 27, 1917 |
| 2,162,230 | Salfisberg | June 13, 1939 |
| 2,443,992 | Sandberg | June 22, 1948 |
| 2,586,580 | Truscott | Feb. 19, 1952 |